United States Patent [19]

Tanahashi et al.

[11] Patent Number: 4,572,394

[45] Date of Patent: Feb. 25, 1986

[54] FUEL TANK FOR USE IN A MOTOR VEHICLE

[75] Inventors: Toshio Tanahashi, Susono; Takaaki Ito, Mishima; Koji Uranishi, Susono, all of Japan

[73] Assignee: Toyota Jidosha Kabushiki Kaisha, Japan

[21] Appl. No.: 719,123

[22] Filed: Apr. 2, 1985

[30] Foreign Application Priority Data

Apr. 6, 1984 [JP]  Japan .................................. 59-049577

[51] Int. Cl.⁴ .............................................. F16J 15/10
[52] U.S. Cl. .............................. 220/86 R; 220/85 VS; 55/387
[58] Field of Search .................. 220/86 R, 85 F, 85 S, 220/85 VR, 85 VS, DIG. 33; 55/74, 387

[56] References Cited

U.S. PATENT DOCUMENTS

| | | |
|---|---|---|
| 3,477,210 | 11/1969 | Hervert .................................. 55/387 |
| 3,748,829 | 7/1973 | Joyce et al. ...................... 220/86 R X |
| 4,028,075 | 6/1977 | Roberge ................................. 55/387 |
| 4,306,894 | 12/1981 | Fukami et al. ..................... 55/387 X |
| 4,312,649 | 1/1982 | Fujii et al. ................... 220/85 VS X |
| 4,504,289 | 3/1985 | Waller ............................... 55/387 X |

Primary Examiner—Steven M. Pollard
Attorney, Agent, or Firm—Finnegan, Henderson, Farabow, Garrett & Dunner

[57] ABSTRACT

A fuel tank comprising a fuel inlet pipe and a canister housing which surrounds the upper portion of the fuel inlet pipe. A valve body is arranged in the upper portion of the fuel inlet pipe. A fuel vapor passage continuously connected to the interior of the fuel tank is formed between the valve body and the upper portion of the fuel inlet pipe. The valve body has a valve portion cooperating with a cap. When the cap is screwed into the threaded bore formed in the canister housing, the valve body disconnects the fuel vapor passage from the canister housing. When the cap is unscrewed, the fuel vapor passage is connected to the canister housing.

10 Claims, 2 Drawing Figures

FUEL TANK FOR USE IN A MOTOR VEHICLE

BACKGROUND OF THE INVENTION

1. Field of the Invention

The present invention relates to a fuel tank for use in a motor vehicle.

2. Description of the Related Art

A motor vehicle driven by an internal combustion engine is normally equipped with a fuel tank. When it becomes necessary to replenish the fuel tank with fuel, the cap attached to the fuel inlet of the fuel tank must first be detached, to allow the insertion of a fuel pump nozzle. After the fuel pump nozzle is inserted into the fuel inlet of the fuel tank, fuel is fed into the fuel tank from the fuel pump nozzle. However, when the level of the fuel in the fuel tank is low, the space in the fuel tank above the surface of the liquid fuel is filled with a large amount of fuel vapor under pressure. Consequently, when the cap is detached from the fuel inlet of the fuel tank, the fuel vapor in the fuel tank is forced out of the fuel tank into the outside air, causing air pollution. In addition, when fuel is fed into the fuel tank from the fuel pump nozzle, the fuel spouted from the nozzle comes into violent contact with and agitates the fuel in the fuel tank, causing bubbles to form in the fuel in the fuel tank. The collapsing of these bubbles causes further amounts of fuel vapor to be generated in the fuel tank, and this fuel vapor also escapes from the fuel inlet of the fuel tank, causing more air pollution.

SUMMARY OF THE INVENTION

An object of the present invention is to provide a fuel tank capable of alleviating air pollution caused by the fuel vapor in the tank by preventing the fuel vapor in the fuel tank from escaping to the outside air when the cap is detached from the fuel inlet of the fuel tank.

Thus, according to the present invention, there is provided a fuel tank for use in a motor vehicle, comprising: a canister housing located at a fuel inlet position of the fuel tank and having a thick wall at an upper end thereof, the wall having a threaded bore formed therein and a flat inner face defining a first valve seat; a fuel inlet pipe connected to the fuel tank, an upper portion of the fuel inlet pipe being located in the housing and aligned with the threaded bore, the upper portion of the fuel inlet pipe having an upper end portion which is slightly spaced from the first valve seat and has a diameter larger than that of the threaded bore, the upper end portion thus defining a second valve seat; a cap removably screwed into the threaded bore; the canister housing contains activated carbon. The present embodiment also comprises a valve body made of a resilient material and arranged in the upper portion of the fuel inlet pipe, the valve body having a lower end portion fixed to an inner wall of the fuel inlet pipe and an annular flat upper end valve portion located between the first valve seat and the second valve seat and cooperating with a lower end portion of the cap for seating the valve portion on the second valve seat when the cap is screwed into the threaded bore and for seating the valve portion on the first valve seat due to the resiliency of the valve body when the cap is unscrewed. The upper portion of the fuel inlet pipe and the valve body define therebetween a fuel vapor passage which is continuously connected to an interior of the fuel tank and is connected to the canister housing via a clearance formed between the valve portion and the second valve seat when the cap is unscrewed.

The present invention may be more fully understood from the description of a preferred embodiment of the invention set forth below, together with the accompanying drawings.

DESCRIPTION OF A PREFERRED EMBODIMENT

Figure 1:
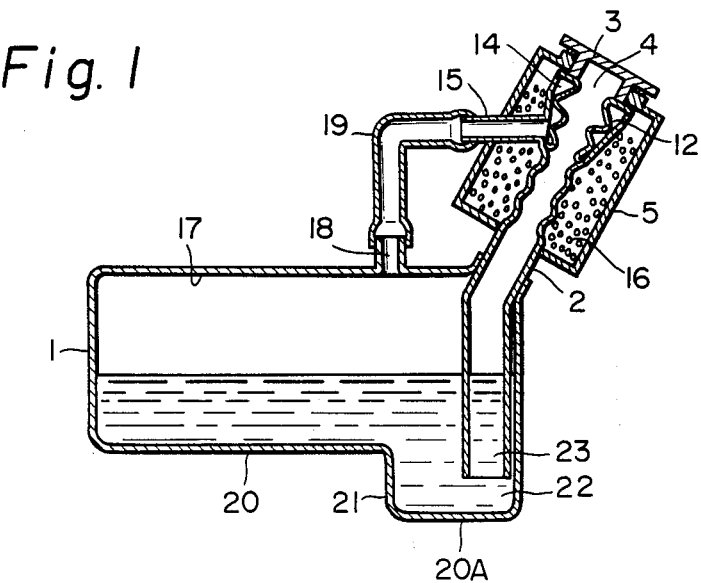
FIG. 1 is a cross-sectional side view of a fuel tank according to the present invention.
Figure 2:
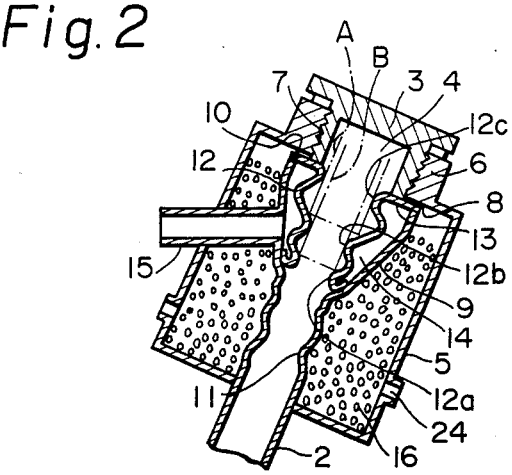
FIG. 2 is an enlarged cross-sectional side view of a portion of the fuel tank illustrated in FIG. 1.

Referring to FIG. 1, reference numeral 1 designates a fuel tank, 2 a fuel inlet pipe, 3 a cap detachably attached to a fuel inlet 4 of the fuel inlet pipe 2, and 5 a canister housing. As illustrated in FIGS. 1 and 2, the canister housing 5 has a hollow cylindrical shape and surrounds the fuel inlet pipe 2. A thick-walled portion 6 having a cylindrical shape is formed on the top portion of the canister housing 5. The thick-walled portion 6 has a threaded bore 7 formed therein and aligned with the fuel inlet pipe 2, and the cap 3 is screwed into the threaded bore 7. The thick-walled portion 6 has a flat lower face which forms a first valve seat 8. The fuel inlet pipe 2 has a conical shaped upper portion 9 which diverges towards the threaded bore 7, the upper end portion 10 of the upper portion 9 of the fuel inlet pipe 2 having a diameter larger than that of the threaded bore 7. The upper end portion 10 of the upper portion 9 is slightly spaced downward from the first valve seat 8 and forms a second valve seat 10. A portion 11 of the fuel inlet pipe 2, adjacent to the upper portion 9, has a corrugated cross section. A valve body 12 made of a resilient material such as rubber is inserted into the upper portion 9, and the lower end portion of the valve body 12 is fixed to the inner wall of the fuel inlet pipe 2 at the lower end of the upper portion 9. The valve body 12 has a bellows-like shape diverging towards the threaded bore 7 and has a three annular projecting portions 12a, 12b, 12c. The diameter of the projecting portions 12a, 12b, 12c increases towards the threaded bore 7. The valve body 12 has an annular flat upper end portion 13 inserted between the first valve seat 8 and the second valve seat 10. This annular flat upper end portion 13 forms a valve portion 13, which can be seated on the first valve seat 8 or the second valve seat 10. An annular fuel vapor passage 14 is formed between the valve body 12 and the upper portion 9 of the fuel inlet pipe 2, and a fuel vapor outlet tube 15 is connected to the fuel vapor passage 14. The interior of the canister housing 5 is filled with an activated carbon 16, and the fuel vapor outlet tube 15 extends into the activated carbon 16. As illustrated in FIG. 1, a fuel vapor outlet 18 is formed on the upper wall 17 of the fuel tank 1 and connected to the fuel vapor outlet tube 15 via a connecting hose 19. A portion 20a of the lower wall 20 of the fuel tank 1 is expanded downward, and a small chamber 22 surrounded by a vertical wall 21 of the fuel tank 1 is formed above the expanded portion 20a. The fuel inlet pipe 2 extends downward in the fuel tank 1 to the interior of the small chamber 22, and the fuel outlet 23 of the fuel inlet pipe 2 is open to the interior of the small chamber 22.

When the cap 3 is screwed into the threaded bore 7 as illustrated in FIG. 2, the lower end portion of the cap 3 engages with the inner peripheral edge of the upper wall of the valve portion 13 of the valve body 12 and causes the outer peripheral edge of the lower wall of the valve portion 13 to be seated on the second valve seat 10. Consequently, at this time, since the fuel vapor passage 14 is closed by the valve portion 13, the fuel vapor in the fuel tank 1 is not fed into the interior of the canister housing 5. However, when the pressure of fuel vapor in the fuel tank 1 exceeds a predetermined pressure, the outer periphery of the valve portion 13 is bent upward and is separated from the second valve seat 10. As a result, a part of the fuel vapor in the fuel tank 1 flows into the canister housing 5 from the clearance between the valve portion 13 and the second valve seat 10 via the connecting hose 19 and the fuel vapor passage 14. Consequently, the valve portion 13 has a function of maintaining the pressure of fuel vapor in the fuel tank 1 at a predetermined pressure and thereby suppressing the vaporization of fuel in the fuel tank 1, and also functions as a safety valve for preventing the pressure of fuel vapor in the fuel tank 1 from exceeding a predetermined pressure.

When the cap 3 is unscrewed in order to carry out the fuel filling operation, the valve portion 13 moves upward due to the resiliency of the valve body 12. As a result, the lower wall of the valve portion 13 is separated from the second valve seat 10, and the upper wall of the valve portion 13 is seated on the first valve seat 8. Thus, at this time, the fuel vapor in the fuel tank 1 passes through the connecting hose 19 and the fuel vapor passage 14 and is then fed into the canister housing 5 via the clearance between the valve portion 13 and the second valve seat 10. The cap 3 is then further unscrewed and detached from the fuel inlet 4. At this time, a large part of the fuel vapor in the fuel tank 1 has been fed into the canister housing 5, and an extremely small amount of the fuel vapor in the fuel inlet pipe 2 escapes from the fuel inlet 4 to the outside air. Then, as illustrated by the dash-dot line A in FIG. 2, the fuel pump nozzle A is inserted into the threaded bore 7. At this time, since the tip of the fuel pump nozzle A abuts against the annular projecting portion 12b of the valve body 12 and causes the valve body 12 to move downward, the valve portion 13 is seated again on the second valve seat 10, and thus the outflow of fuel vapor from the fuel vapor passage 14 is stopped. Therefore, at this time, there is no danger that the fuel vapor will escape to the outside air via the threaded hole 7. Where the diameter of the fuel pump nozzle is small, as illustrated by the dash-dot line B in FIG. 2, the tip of the fuel pump nozzle B abuts against the annular projecting portion 12a of the valve body 12. Consequently, it is possible to isolate the interior of the fuel tank 1 from the outside air independently of the size of the fuel pump nozzle when the fuel pump nozzle is inserted into the fuel inlet 4. Then, the fuel is fed from the fuel pump nozzle into the small chamber 22. At this time, if the small chamber 22 is filled with fuel, the fuel fed from the fuel pump nozzle comes into violent contact with the fuel located in the fuel inlet pipe 2. Consequently, at this time, only the fuel located in the fuel inlet pipe 2 forms bubbles and vaporizes, and thus the amount of the fuel vapor generated by bubbling is small. Where the fuel remains only in the bottom portion of the small chamber 22, the entire amount of fuel in the small chamber 22 bubbles and vaporizes when the fuel is fed from the fuel pump nozzle. However, the volume of the small chamber 22 is small, and thus the amount of fuel vapor generated by the bubbling is small. Consequently, the amount of fuel vapor escaping from the fuel inlet 4 to the outside air when the fuel pump nozzle is removed from the fuel inlet 4 is small.

When the fuel pump nozzle is removed, the valve portion 13 is again seated on the first valve seat 8, and when the cap 3 is screwed into the threaded bore 7, the valve portion 13 is then seated on the second valve seat 10. The fuel vapor fed into the canister housing 5 is absorbed by the activated carbon 16, and the fuel vapor absorbed by the activated carbon 16 is drawn into the intake manifold (not shown) via a purge port 24 (not shown) at a predetermined engine operating state.

The absorption of fuel vapor causes heat to generate, and thus, if a large amount of the fuel vapor is absorbed by the activated carbon 16 for a short time as in the present invention, there is a danger that the activated carbon 16 will become overheated. However, in the present invention, when the fuel filling operation is carried out, since the fuel spouted from the fuel pump nozzle comes into contact with the portion 11 of the fuel inlet pipe 2, this portion 11 is cooled by the fuel. As a result, the activated carbon 16 is cooled, and thus it is possible to prevent the activated carbon 16 from becoming overheated.

According to the present invention, when the cap 3 is unscrewed in order to carry out the fuel filling operation, the fuel vapor in the fuel tank 1 is fed into the canister housing 5. In addition, during the fuel filling operation, the fuel vapor in the fuel tank 1 does not escape to the outside air. Therefore, it is possible to prevent air pollution caused by the escape of the fuel vapor. Furthermore, since the valve portion 13 of the valve body 12 functions as a safety valve when the cap 3 is screwed into the threaded bore 7, it is possible to suppress the vaporization of fuel in the fuel tank 1 and prevent the pressure of fuel vapor in the fuel tank 1 from becoming more than a predetermined pressure.

While the invention has been described by reference to a specific embodiment chosen for purposes of illustration, it should be apparent that numerous modifications could be made thereto by those skilled in the art without departing from the basic concept and scope of the invention.

We claim:

1. A fuel tank for use in a motor vehicle, comprising:
a canister housing located at a fuel inlet position of said fuel tank and having a thick wall at an upper end thereof, said thick wall having a threaded bore formed therein and a flat inner face defining a first valve seat, said canister housing having an activated carbon contained therein;
a fuel inlet pipe connected to said fuel tank and having an upper portion located in said canister housing and aligned with said threaded bore, said upper portion having an upper end portion which is slightly spaced from said first valve seat and has a diameter larger than that of said threaded bore, said upper end portion defining a second valve seat;
a cap removably screwed into said threaded bore; and
a valve body made of a resilient material and arranged in said upper portion of said fuel inlet pipe, said valve body having a lower end portion fixed to an inner wall of said fuel inlet pipe and having an annular flat upper end valve portion which is located between said first valve seat and said second valve seat and cooperating with a lower end portion of said cap for seating said valve portion on said second valve seat when said cap is screwed into said threaded bore and for seating said valve portion on said first valve seat due to the resiliency of said valve body when said cap is unscrewed, said upper portion of said fuel inlet pipe and said valve body defining therebetween a fuel vapor passage which is continuously connected to an interior of said fuel tank and is connected to said canister housing via a clearance formed between said valve portion and said second valve seat when said cap is unscrewed.

2. A fuel tank according to claim 1, wherein, when said cap is screwed into said threaded bore, the lower end portion of said cap abuts against an inner periphery of an upper wall of said valve body, and an outer periphery of a lower wall of said valve portion is seated on said second valve seat for automatically opening said valve body to connect said fuel vapor passage to said canister housing when the fuel vapor pressure in said fuel tank exceeds a predetermined pressure.

3. A fuel tank according to claim 1, wherein said valve body diverges towards said threaded bore.

4. A fuel tank according to claim 3, wherein said valve body has a plurality of axially spaced annular projecting portions, the diameters of said projecting portions being increased towards said threaded bore.

5. A fuel tank according to claim 1, wherein said canister housing has a cylindrical outer wall surrounding said fuel inlet pipe, said activated carbon being arranged between said cylindrical outer wall and said fuel inlet pipe.

6. A fuel tank according to claim 5, wherein said fuel inlet pipe has a portion having a corrugated cross section, said portion being located in said canister housing adjacent to said upper portion of said fuel inlet pipe.

7. A fuel tank according to claim 5, further comprising a fuel vapor tube connecting the interior of said fuel tank to said fuel vapor passage and extending into said activated carbon.

8. A fuel tank according to claim 1, wherein said fuel inlet pipe extends to a bottom interior of said fuel tank.

9. A fuel tank according to claim 8, wherein said fuel tank has a small chamber expanding downward from a bottom wall of said fuel tank, said fuel inlet pipe extending to an interior of said small chamber.

10. A fuel tank according to claim 1, wherein a fuel vapor outlet is formed on an upper wall of said fuel tank, said fuel vapor passage being connected to said fuel vapor outlet.

* * * * *